(12) United States Patent
Tatraux-Paro et al.

(10) Patent No.: US 7,159,454 B2
(45) Date of Patent: Jan. 9, 2007

(54) METHOD OF UNSEATING A TIRE

(75) Inventors: Jean-Michel Tatraux-Paro, Clermont-Ferrand (FR); Patrice Gauthier, Chappes (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/255,911

(22) Filed: Oct. 24, 2005

(65) Prior Publication Data
US 2006/0086183 A1 Apr. 27, 2006

Related U.S. Application Data

(60) Provisional application No. 60/661,154, filed on Mar. 14, 2005.

(30) Foreign Application Priority Data
Oct. 25, 2004 (FR) .................................. 04 11422

(51) Int. Cl.
*G01M 17/02* (2006.01)
(52) U.S. Cl. ...................................................... 73/146
(58) Field of Classification Search ........ 73/146–146.8
See application file for complete search history.

(56) References Cited

U.S. PATENT DOCUMENTS

| | | | |
|---|---|---|---|
| 3,662,597 A | 5/1972 | DeGhetto | |
| 4,700,765 A | 10/1987 | Masclaux | |
| 4,878,527 A | 11/1989 | Noma | |
| 5,139,067 A | 8/1992 | Shiozawa et al. | |
| 5,253,692 A | 10/1993 | Stephens et al. | |
| 6,321,806 B1 | 11/2001 | Sakamoto | |
| 6,580,980 B1 | 6/2003 | Gauthier et al. | |
| 6,772,626 B1 * | 8/2004 | Engel et al. | 73/146 |
| 6,889,542 B1 * | 5/2005 | Deverre et al. | 73/146 |
| 2004/0083803 A1 | 5/2004 | Deverre et al. | |

* cited by examiner

*Primary Examiner*—Edward Lefkowitz
*Assistant Examiner*—Jermaine Jenkins
(74) *Attorney, Agent, or Firm*—Buchanan Ingersoll & Rooney PC

(57) ABSTRACT

The resistance to unseating of at least one tire mounted on a mounting rim and inflated to a predetermined pressure is determined by mounting the tire/rim unit on a vehicle in a steering axle position. The vehicle is set in motion in a straight path and stabilized at a predetermined speed. The steering wheel is then rotated to impose a steering angle which is maintained so that the vehicle travels along a circular trajectory arc. If the tire does not unseat, increases in the steering angle are made periodically so that the vehicle travels in progressively tighter circular trajectory arcs until either the tire becomes unseated or the steering wheel reaches its terminal stop.

12 Claims, 9 Drawing Sheets

METHOD OF UNSEATING A TIRE

The present application claims priority under 35 U.S.C. §119 and/or §365 to patent application Ser. No. 04/11422 filed in France on Oct. 25, 2004, and U.S. Provisional Application Ser. No. 60/661,154 filed on Mar. 14, 2005.

FIELD OF THE INVENTION

The present invention relates to test methods for tires.

BACKGROUND OF THE INVENTION

"Unseating" of a tire means at least one of the beads of the tire escaping from all or part of the seat of the rim on which the tire is mounted. The capacity of a tire to resist unseating is one of the features which is important to the safety of the users of a vehicle with tires, since unseating is associated with considerable deterioration of rolling performance. A study of the phenomenon has shown that there are two types of unseating: (1) unseating resulting from violent impacts to the sidewall or the tread of the tire, such as for example an impact against a pavement or passage of the tire over a hole in the roadway, and (2) unseating in the presence of very strong mechanical stresses such as for example during travel at high speed round a bend with a small radius of curvature, all this possibly being made worse by an inflation pressure lower than the operating pressure. The invention relates to a test method for quantifying the behavior of tires in relation to unseating of the second type.

A distinction may be drawn between two categories of test methods which make it possible to study and quantify unseating of a tire: methods for testing on machines and methods for testing on tracks. An example of a method for testing on machines is described in the patent U.S. Pat. No. 3,662,597, according to which a conical member is applied against a sidewall of the tire, then the pressure exerted against the sidewall is increased and displacement of the sidewall is recorded. A similar test method is to be found in Federal Motor Vehicle Safety Standard No. 109, drawn up by the NHTSA (National Highway Traffic Safety Administration), the American Federal road safety body.

Another device was proposed in patent application WO 02 090919: once again, a force is applied to the tire mounted on a rim and inflated to a given pressure, but unlike in the method described in document U.S. Pat. No. 3,662,597, the force is not applied to the sidewall of the tire, but to the part of the tire intended to be in contact with the ground, until unseating takes place.

Track tests are complementary to the tests on machines, since they place the tire under conditions which are closer to the conditions of use of a vehicle. Qualification of a tire by a vehicle manufacturer frequently depends, inter alia, on the results obtained in unseating tests on track. These tests are particularly critical when the tires in question are designed specifically to allow rolling at low or even zero pressure, hereinafter designated "run-flat tires", without significant deterioration of rolling performance.

The unseating tests known from the prior art generally adopt the configuration known as "J turn" or "U turn". As shown in FIG. 3, a vehicle fitted with the tire to be tested starts off at a constant speed along a straight line, subsequently entering a bend whose radius of curvature is predefined. Various runs are performed, with the tire pressure being reduced with each run until unseating occurs. U.S. Pat. No. 4,700,765 describes this type of test, performed at a speed of 50 km/h and with a radius of curvature of 20 meters, but other combinations have been proposed: 60 km/h and 25 meters (EP 334 955), 60 km/h and 30 meters (EP 377 338), 40 km/h and 25 meters (EP 1 036 675) and even 35.5 km/h and 6 meters (EP 376 137). A variant of the test comprises a full turn with a predefined radius of curvature (U.S. Pat. No. 5,253,692).

Under conventional test conditions, passenger-car tires not specifically designed to allow rolling at low or indeed zero pressure suffer unseating at inflation pressures of the order of 1 bar. When the tires in question are designed to allow rolling at inflation pressures of much less than 1 bar without significant deterioration of rolling performance, the method has to be adapted. The test is performed at an inflation pressure of zero; "J turn" runs are performed until unseating takes place, either at a constant speed (EP 377 338) or at progressively increasing speed (EP 334 955). The number of runs without unseating serves as an indicator of tire performance.

One of the difficulties of this approach is that the results cannot be reproduced satisfactorily, due to the fact that the steering angle during the bend is not controlled. "Steering angle" means the angle of rotation imposed by a driver on the steering wheel of a vehicle in order to modify the trajectory of the vehicle. In principle, the test driver has to keep the tire to be evaluated on the ideal trajectory (recommended radius of curvature), but the trajectory over which it actually travels is only ever an approximation thereof, as shown in FIG. 4. To be valid, the trajectory has to be situated within the limits formed by the circles of radius R+ and R−. A vast number of trajectories are possible within these limits: a driver may approach the bend by imposing an elevated steering angle and then correct this angle towards lower values, or conversely start the maneuver with a small steering angle, and then correcting it to remain within the limits. This maneuvering latitude results in weak reproducibility. Another drawback of the previous approach lies in its very low discriminatory capacity. Very often, it is used as a binary test (the tire either does or does not fulfill the criterion set) and does not allow the classification of tires which have fulfilled the criterion: thus it is impossible to distinguish between two types of tires which have resisted unseating after a recommended number of runs.

U.S. Pat. No. 6,580,980 provides greater reproducibility, by proposing a variant of the method which allows the problem of steering angle variation to be avoided. The driver of the vehicle traveling in a straight line suddenly changes the steering angle (generally to a value of around 180°), at a high angular velocity (of the order of 300° per second). The performance of the tire is evaluated as a function of the number of beads (0, 1 or 2) of the tire which have suffered unseating. Other parameters, such as the maximum level of transverse acceleration of the vehicle during the test or alternatively the deviation from the recommended trajectory may serve in evaluation of the unseating performance.

Although this method solves the problem of steering angle reproducibility, it nevertheless exhibits the drawback of being limited to a single steering angle, which reduces the quantity of usable data and the precision of ranking.

Consequently, there is a need for a tire testing method which makes it possible to determine the capacity of a tire to resist unseating and to draw up a ranking of a plurality of tires of different design.

SUMMARY OF THE INVENTION

According to the invention, a method is proposed for determining the resistance to unseating of at least one tire mounted on a mounting rim and inflated to a predetermined pressure, this method consisting in:

(A) equipping a vehicle with the tire in a steering axle position;

(B) setting the vehicle in motion and stabilizing it at a predetermined speed;

(C) imposing a steering angle, by rotation of the steering wheel, and maintaining it for a predetermined period, the vehicle advancing at the predetermined speed in such a way that the tire travels over a trajectory portion in the form of an arc of a circle;

(D) repeating step (C), progressively increasing the steering angle until at least one condition selected from among the following is fulfilled:

(i) the tire becomes unseated, or (ii) the steering wheel reaches its stop.

The driver may impose a first steering angle before the speed is stabilized. This may prove necessary, for example, when the inflation pressure of the tire(s) to be evaluated has been lowered. It is possible to impose the first steering angle when the vehicle is still stationary, thereafter setting the vehicle in motion and stabilizing it at the predetermined speed. In this case one considers the arc of a circle which is traveled over after stabilization at the predetermined speed= and then the steering angle is increased progressively.

The trajectory traveled by the vehicle in a test according to the method of the invention comprises a plurality of arcs of circles, each of these arcs of circles corresponding to an imposed steering angle value. The arcs of circles constitute the "useful part" of the trajectory, that is to say the part serving to determine the capacity of the tire to resist unseating. Two consecutive arcs of circles may or may not be separated by an intermediate trajectory portion. All the useful part must be traveled over at the predetermined speed, but no conditions are set regarding the speed at which any intermediate trajectory portion is traveled.

In the present document, increase in steering angle means the increase in its absolute value, irrespective of the direction of rotation of the steering wheel. Two successive rotations of the steering wheel, each serving to impose a steering angle, may be effected in the same direction or in mutually opposing directions. In other words, the direction of rotation of the steering wheel may or may not be reversed for two successive arcs of circles.

A progressive increase in the steering angle results in a progressive reduction in the radius of curvature of the arcs of circles traveled over by the vehicle. The progressive increase in the steering angle does not rule out the possibility of imposing the same steering angle two or more times before increasing the steering angle.

According to a preferred embodiment, the vehicle is displaced, before each increase in steering angle, in such a way that all the trajectory portions in the form of arcs of circles have substantially the same starting point. Thus, two consecutive arcs of circles are separated by an intermediate trajectory portion allowing displacement of the vehicle in such a way that all the trajectory portions in the form of arcs of circles constituting the useful part of the trajectory have substantially the same point of origin. This embodiment is advantageous insofar as it makes it possible to return the tire to substantially the same conditions of stress and the same thermal state before traveling over each arc of a circle. This embodiment also makes it possible to perform the tests on a relatively small surface area.

According to a second preferred embodiment, the trajectory traveled by the tire until one of the two conditions (i) and (ii) is fulfilled is an uninterrupted succession of arcs of circles. This embodiment is advantageous because it avoids intermediate maneuvers: thus, the duration of each test may be reduced. Another advantage of this embodiment is that it allows the tests to be automated. In effect, stabilization of the speed of the vehicle and the increase in steering angle until the tire is unseated may be easily performed by an automatic onboard system.

When the second preferred embodiment is implemented, the increase in steering angle may be continuous, with a constant or variable speed of rotation of the steering wheel, or it may also be effected in steps of discrete values, each new value being maintained for a predetermined time, which also corresponds to a predetermined distance of travel (the speed of the vehicle being constant).

When the steering angle is increased by steps of discrete values, it is preferable to maintain each angular value for a certain duration so as to achieve stabilization of the stresses in the contact zone between tire and roadway. Preferably, the first increase in steering angle to a value equal to an angle $\alpha 0$ (alpha 0) different from 0° which causes the tire to travel over the first trajectory portion formed of an arc of a circle is greater than the subsequent increases $\Delta\alpha$ (delta alpha) which correspond to fractions of the angle $\alpha 0$ (alpha 0). Selecting a large increase at the start of the test makes it possible to pass rapidly through a range in which unseating should not take place and thus to reduce the duration of the test. When the test is performed according to the second preferred embodiment, this marked initial increase also makes it possible to reduce the surface area necessary to perform the test: in effect, a small steering angle results in a trajectory with a large radius of curvature and consequently means that the arc of a circle traveled over by the tire has a large radius. The steering angle is then increased by smaller steps $\Delta\alpha$ (delta alpha) to obtain a more precise measurement of the behavior of the tire.

Preferably, the increases in steering angle are effected at speeds of rotation of the steering wheel of greater than 300°, and preferably greater than 500° per second, because this makes it possible to reduce the time during which the tire is under transient conditions of stress.

In order to limit discrepancies in the predetermined steering angle values, the vehicle preferably has a means for assisting in the rapid achievement of a predetermined steering angle. This may be a simple mark on the steering wheel and on the instrument panel, but it is also possible to effect measurement of the steering angle and to display the measured value in real time on the instrument panel of the vehicle. The vehicle may also be fitted with mechanical means allowing rapid, precise achievement of a given steering angle.

The method according to the invention makes it possible to evaluate simultaneously a number of tires corresponding to twice the vehicle's number of steering axles. By way of example, it is possible to evaluate simultaneously two tires mounted on the single steering axle of a passenger vehicle. Preferably, one single tire is evaluated during each test. The other tires are preferably inflated to the nominal pressure so as not to modify the cornering behavior of the vehicle. If the tire to be evaluated is a run-flat tire, the other tires fitted on the vehicle may or may not be run-flat tires.

In general, the tests are conducted such that the tire to be evaluated for unseating is located on the vehicle on the outside relative to the centre of curvature of each of the arcs of circles forming the useful part of the trajectory, since that is the position under the greatest mechanical stress. However, it is also possible to carry out the test in such a way that the tire to be evaluated for unseating is located on the inside relative to the centre of curvature of each of the arcs of circles, or alternatively to alternate between the in- and outside, either by fitting the tire to be evaluated successively on the two sides of the vehicle, or by alternating the direction of rotation of the steering wheel.

When run-flat tires are to be evaluated, a zero inflation pressure is preferably used because it is at that pressure that unseating will occur soonest.

BRIEF DESCRIPTION OF THE DRAWINGS

Other features and advantages of the invention are revealed by the description given below with reference to the attached drawings.

DESCRIPTION OF PREFERRED EMBODIMENTS

Figure 1:
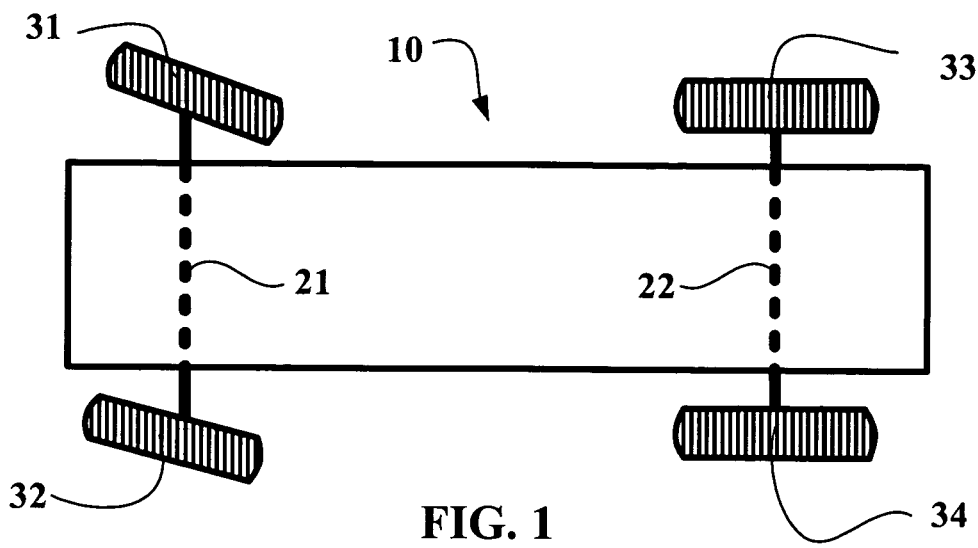
FIG. 1 is a schematic representation of a vehicle equipped with a tire to be tested.

FIG. 1 is a schematic representation of a vehicle 10 equipped with a steering axle 21 provided with two tire and wheel assemblies 31 and 32 and with a non-steering axle 22 provided with two tire and wheel assemblies 33 and 34.

Figure 2:
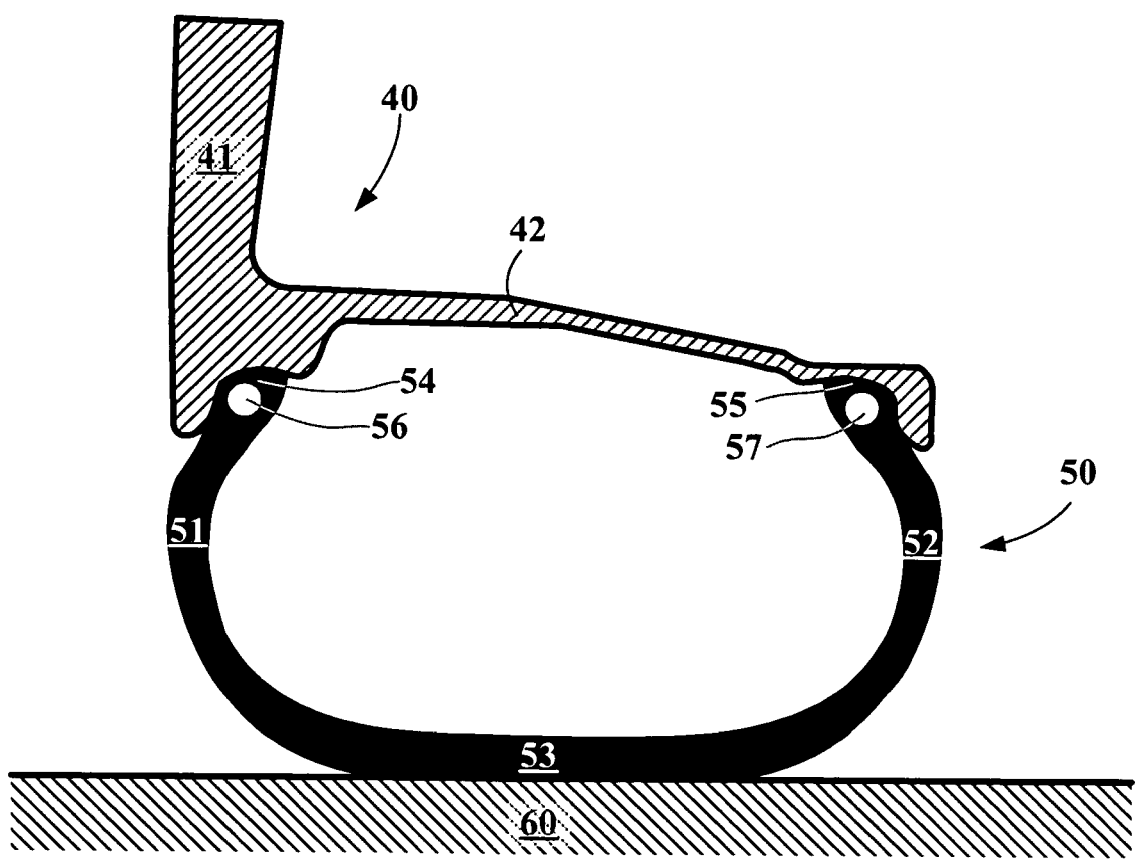
FIG. 2 is a schematic representation of a partial section through an assembly consisting of a wheel and a tire.

FIG. 2 is a schematic representation of a partial section through an assembly formed of a wheel 40 (comprising a disc 41 and a rim 42) and a tire 50 comprising a pair of beads 54 and 55, each containing a bead wire 56, 57 embedded therein, a pair of sidewall parts 51, 52 and a tread 53 which establishes contact between the tire and the surface of the roadway 60.

Figure 3:
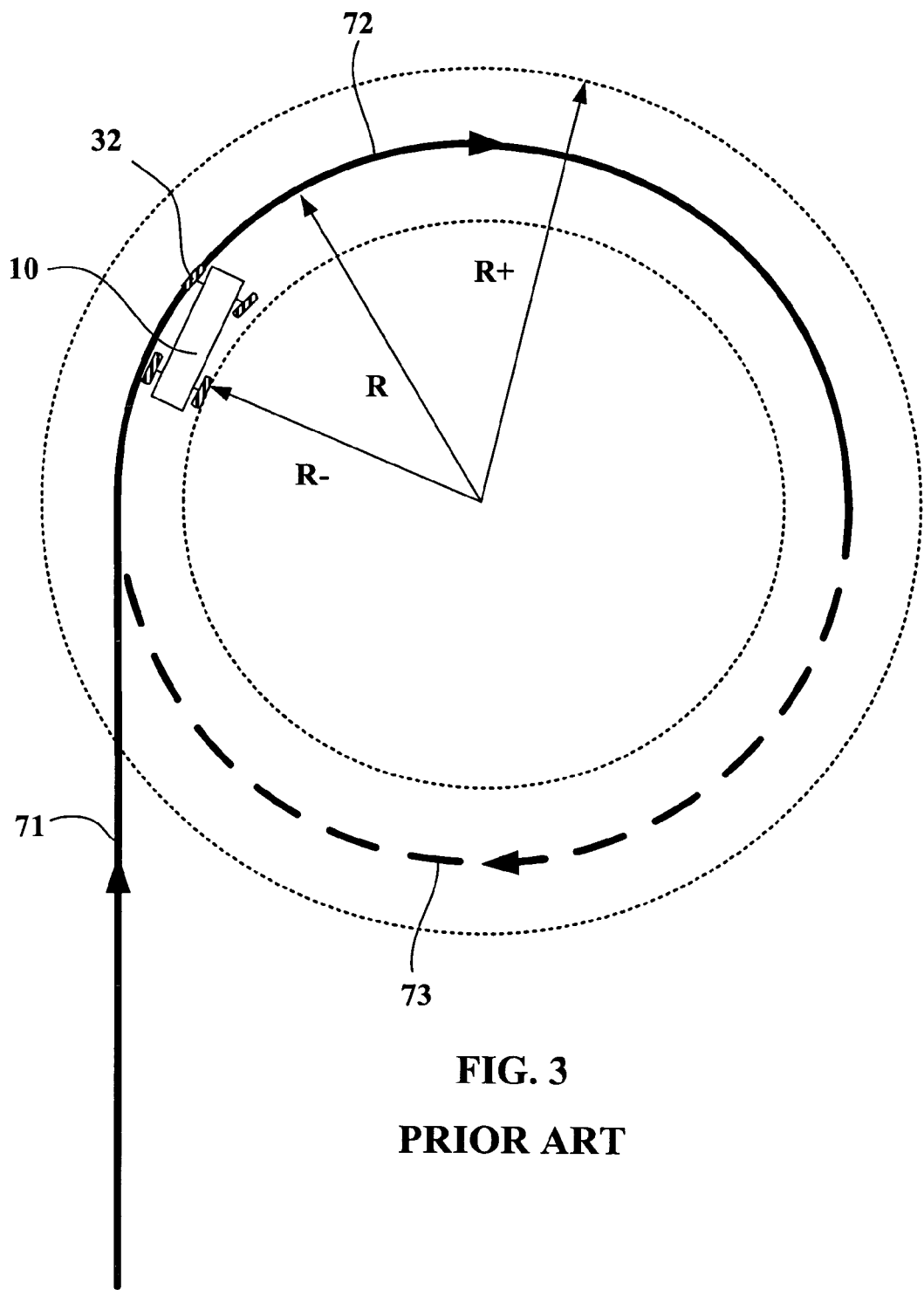
FIG. 3 is a schematic representation of an unseating test configuration according to the prior art.

An unseating test configuration according to the prior art is represented schematically in FIG. 3. The vehicle 10 fitted with a tire and wheel assembly 32 comprising the tire to be tested, the inflation pressure of which may be zero, starts off at a constant speed (typically between 40 and 60 km/h) along a straight line 71, then moving into a bend such that the tire and wheel assembly 32 travels over a trajectory portion formed of an arc of a circle whose radius of curvature R is predefined. In tests of the "J-turn" or "U-turn" type, the vehicle 10 travels over a semi-circle 72 before moving to the starting point of the next run, but variants also exist in which the trajectory is extended by a portion 73 so as to form a full circle of the radius of curvature R.

Conventionally, marking is made on the ground to allow the driver to follow the ideal trajectory. Various runs may be made until unseating occurs. The various runs may be made at the same speed or at a progressively increasing speed. The number of runs without unseating serves as an indicator of tire performance.

Of course, the actual trajectory traveled by the tire and wheel assembly 32 differs somewhat from the ideal trajectory. The test is considered valid when the tire and wheel assembly 32 stays inside the limits formed by the circles of radius R+ and R−. These limits, indicated by dotted circles, may or may not be marked out (marks on the ground, marking cones).

Figure 4:
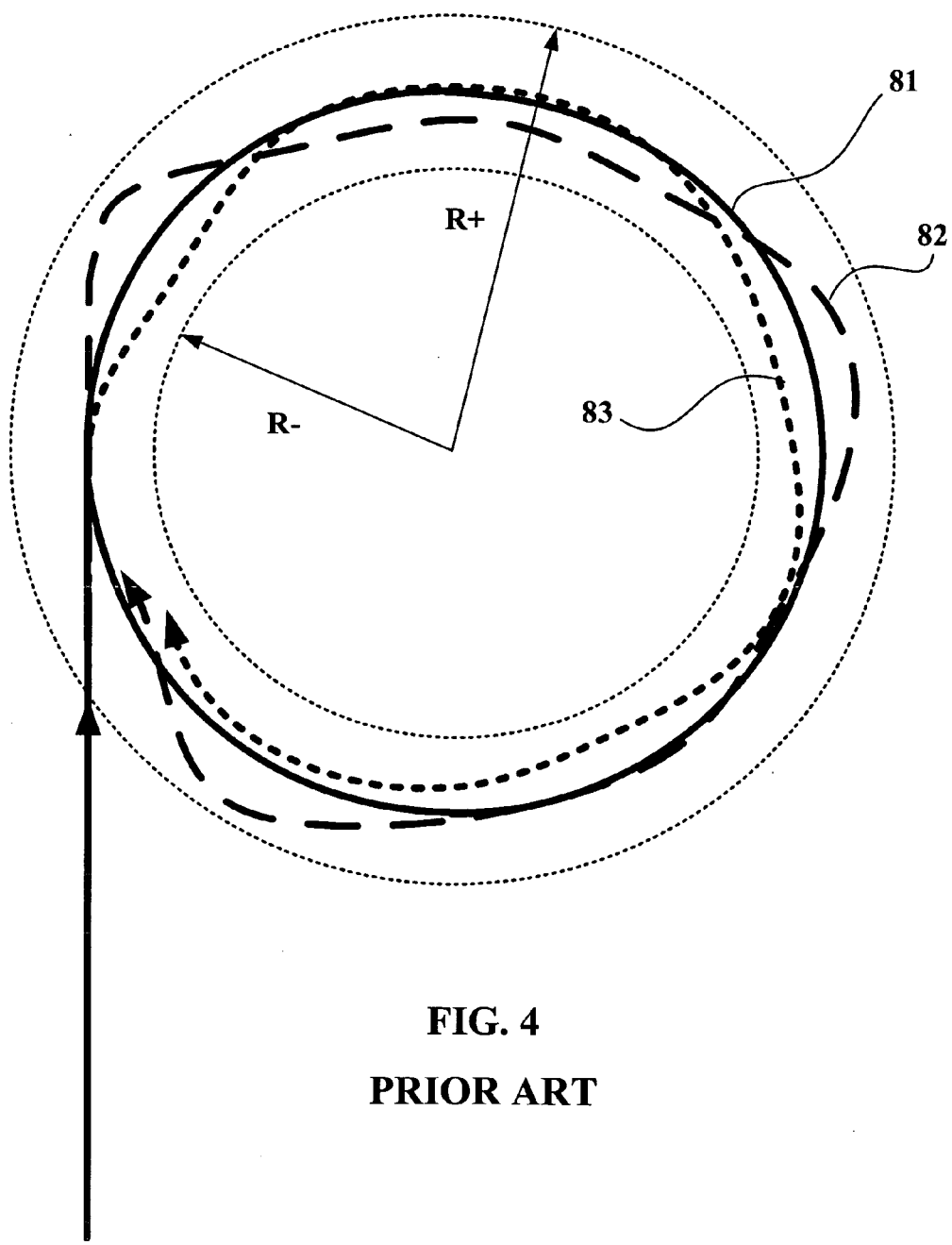
FIG. 4 is a schematic representation of the possible trajectories in an unseating test according to the prior art.

FIG. 4 is a schematic representation of the possible trajectories of the tire to be evaluated in an unseating test according to the prior art. The ideal trajectory 81 (solid line) is compared with two actual trajectories 82 (dashed line) and 83 (dotted line). The two trajectories are considered valid insofar as they remain inside the limits formed by the circles of radius R+ and R−. During the run corresponding to the trajectory 82, the driver modified the steering angle too late to follow the ideal trajectory 81; thereafter, he selected a large steering angle to remain inside the circle of radius R+. During the run corresponding to the trajectory 83, the driver selected an elevated steering angle when approaching the bend, then corrected this angle down towards lower values. The tire was of course not stressed in the same manner during runs 82 and 83. It is this maneuvering latitude which makes the reproducibility of the unseating tests according to the prior art unsatisfactory.

Figure 5:
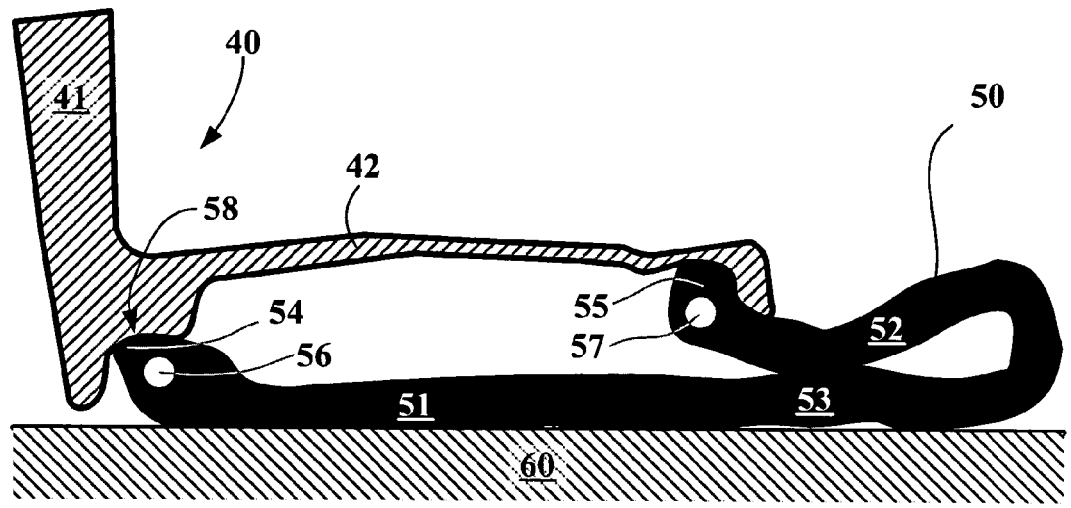
FIGS. 5 and 6 are schematic representations of a partial section through an assembly consisting of a wheel and a tire during an unseating test, shortly before and after unseating.
Figure 6:
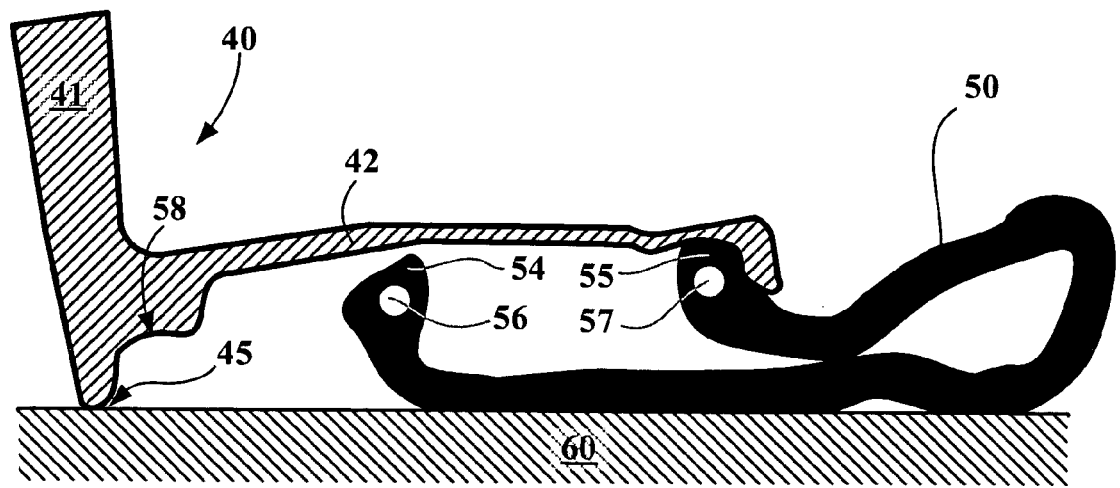

FIGS. 5 and 6 are schematic representations of a partial section through an assembly consisting of a wheel 40 and a tire 50 in the course of an unseating test. FIG. 5 shows the tire 50 shortly before unseating. Under the action of very heavy mechanical stresses, the tire 50 flattens out in the zone of contact with the roadway 60 in such a way that the sidewall 51 of the tire located on the side of the tire which is on the outside relative to the centre of curvature of the trajectory of the vehicle 10 enters into contact with the roadway 60. The bead 54 has rotated about the axis of the bead wire 56 without for all that leaving its seat 58. The sidewall 52 located on the side of the tire which is on the inside relative to the centre of curvature of the trajectory and a part of the tread 53 of the tire form a protuberance on the side of the tire which is on the inside relative to the centre of curvature of the trajectory.

FIG. 6 shows the same tire a few moments after unseating. The bead 54 containing the bead wire 56 has left its seat 58, returning to its initial orientation before rotation about the axis of the bead wire 56. The driver of the vehicle detects the unseating as a result of an abrupt change in the behavior of the tire and possibly as a result of the noise generated by the friction of the rim 42 on the surface the roadway 60 at the point 45.

Figure 7:
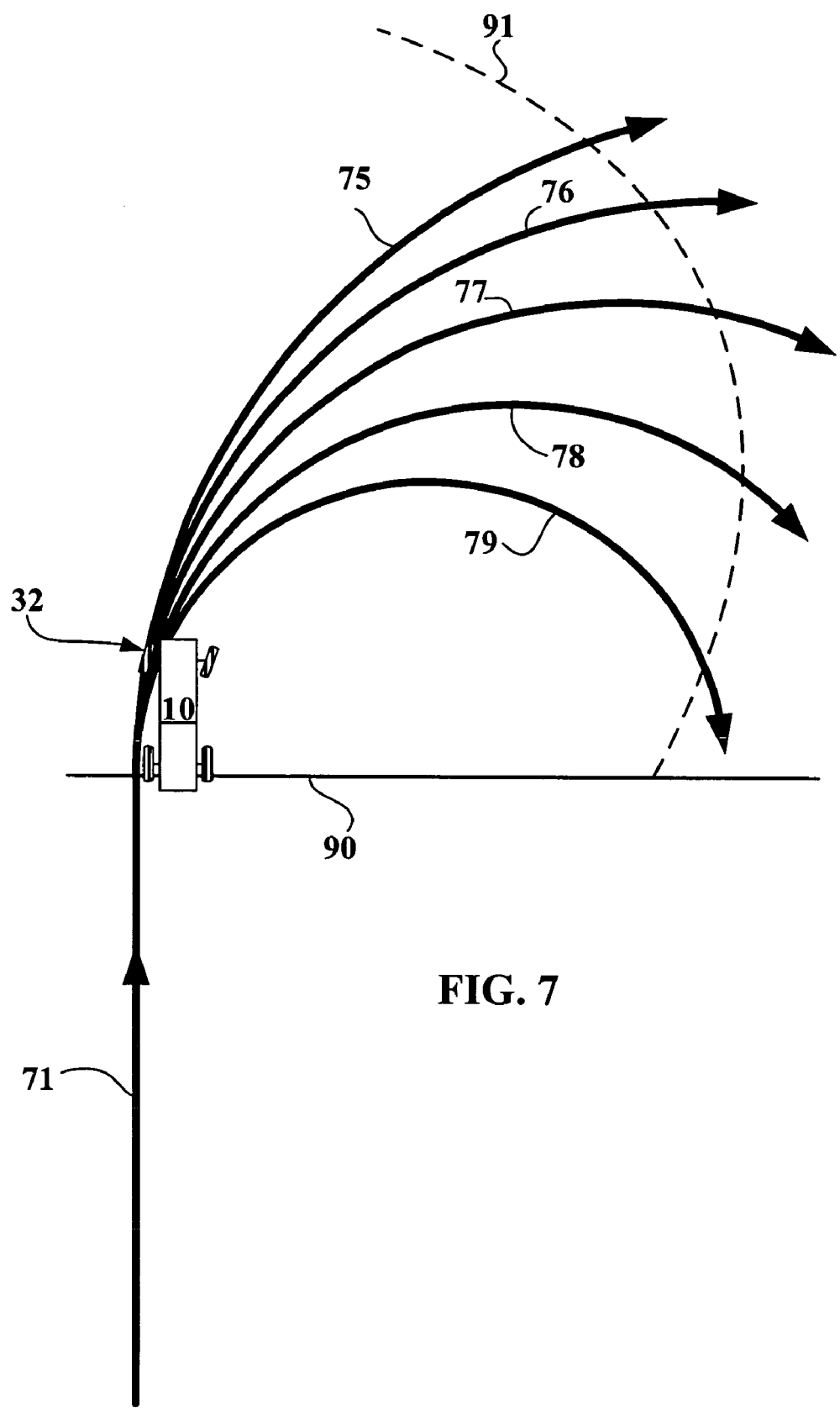
FIGS. 7 to 10 are schematic representations of the possible trajectories in an unseating test according to the invention.
Figure 8:
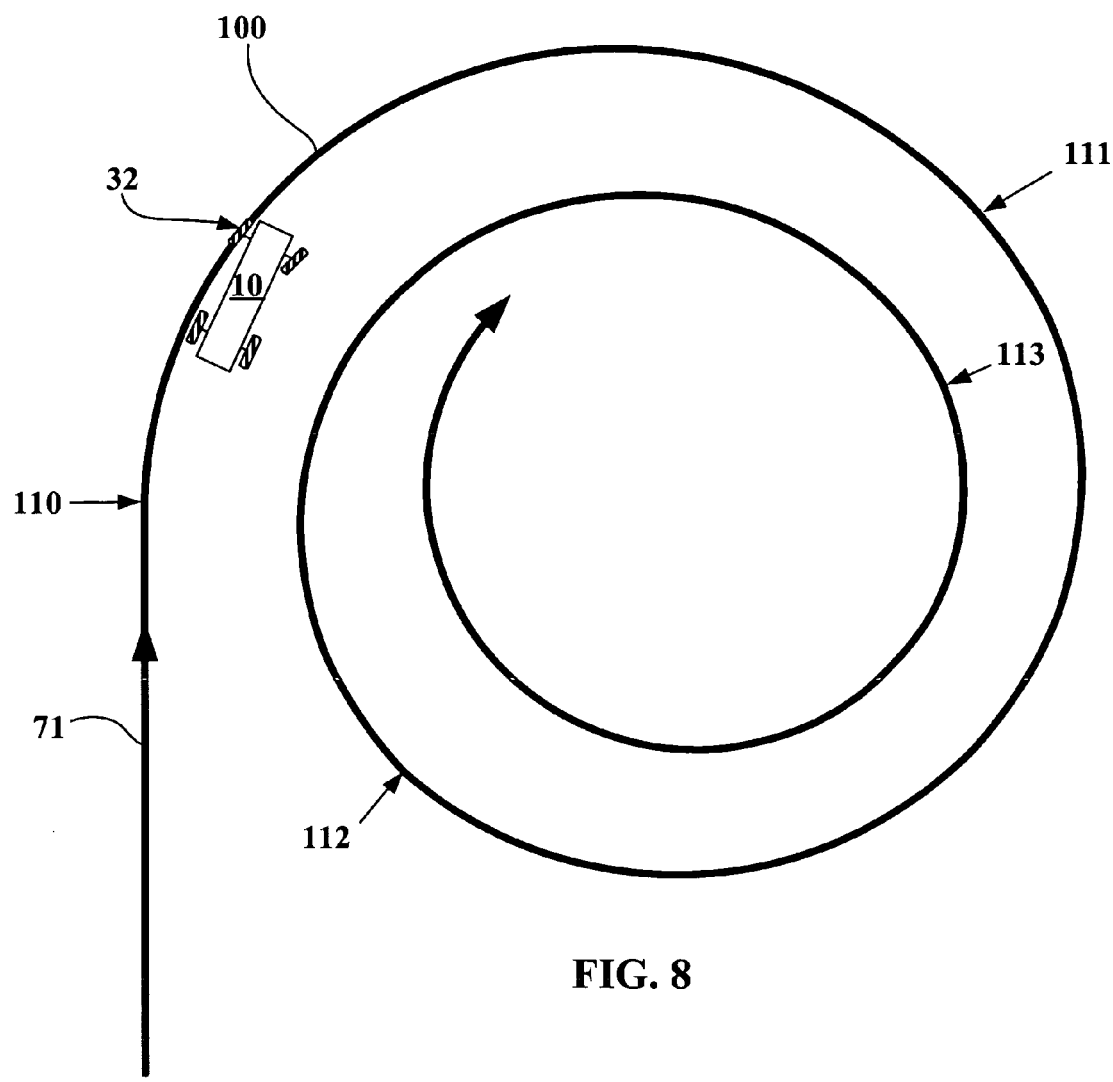
Figure 9:
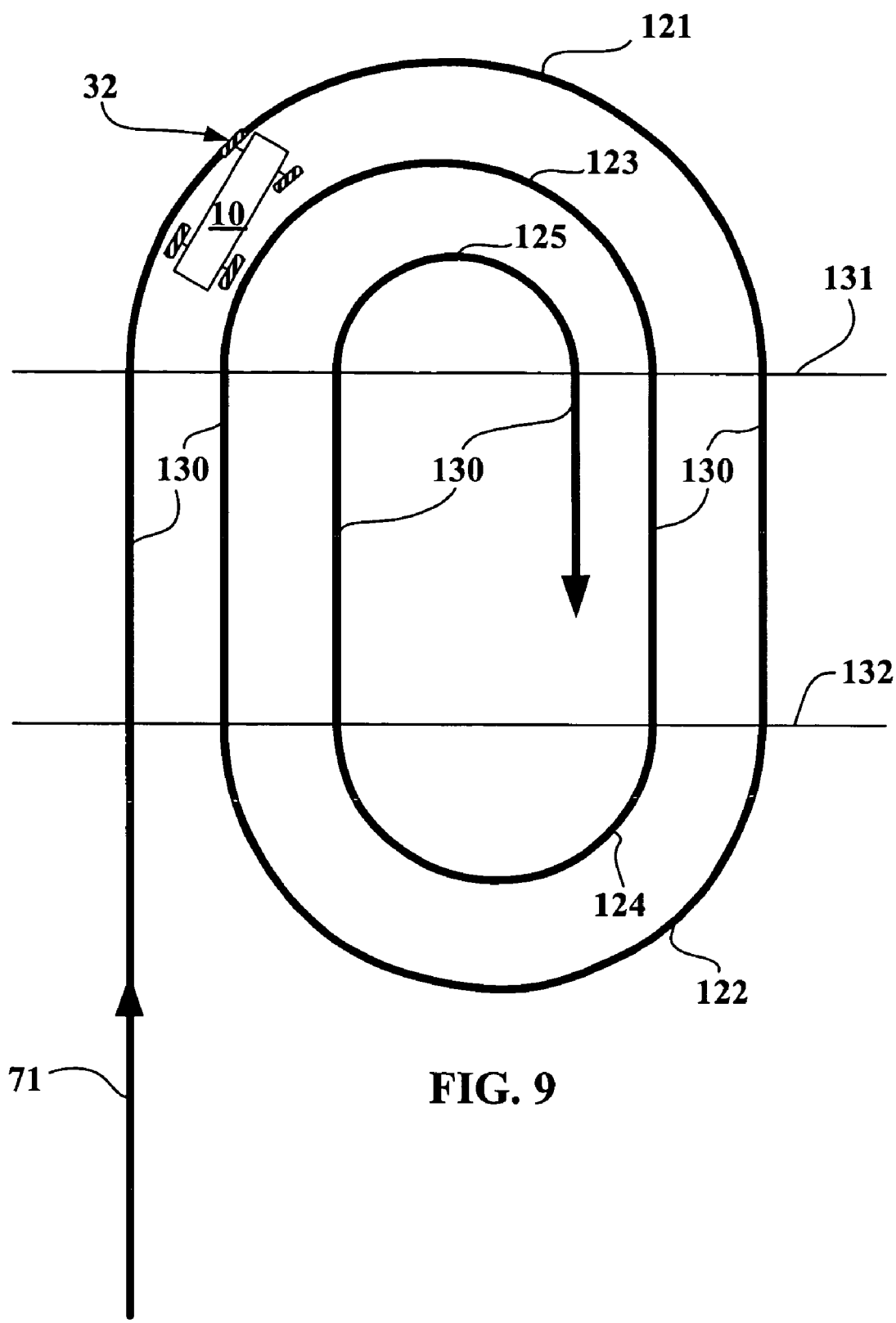

FIGS. 7 to 9 are schematic representations of the possible trajectories in an unseating test according to the invention.

FIG. 7 shows an embodiment of the invention linking together several runs of the "J-turn" type. The test is performed on dry ground. The steering axle 21 of the vehicle 10 is fitted with a tire and wheel assembly 32 comprising the tire to be evaluated, the inflation pressure of which may be zero. The vehicle 10 starts off at the constant speed of 60 km/h along a straight line 71. When the tire and wheel assembly 32 crosses the line 90, the driver increases the steering angle with a speed of rotation of the steering wheel of greater than 300° per second. The test conditions (fitting of tire, direction of rotation of steering wheel) are selected such that the tire and wheel assembly 32 is located on the side of the vehicle 10 which is on the outside relative to the centre of curvature of the trajectory portion. In the present example, the initial steering angle was fixed at 90°. This value is justified by the fact that lateral acceleration is very slight for steering angles of less than 90°: at 60 km/h, values of the order of 0.1 G are measured for a steering angle of 30°. To this is added the fact that the steering angle is not zero during progress of the vehicle in a straight line if the driver has to compensate for the behavior of the deflated tire. The steering angle is maintained for a predetermined period or over a predetermined distance, in this instance a distance of 30 meters, corresponding to the tire and wheel assembly 32 crossing the curve 91, which may be marked out on the ground. The trajectory portion traveled by the tire and wheel assembly 32 corresponds to an arc of a circle 75. The transverse acceleration of the vehicle is recorded.

If the tire does not suffer unseating, the vehicle 10 is brought back to the starting point of the first trajectory, then started off at the constant speed of 60 km/h along the straight line 71. When the tire and wheel assembly 32 crosses the line 90, the driver increases the steering angle with a speed of rotation of the steering wheel of greater than 300° per second. In the present example, the steering angle is increased to 120°. The steering angle is maintained over a distance of 30 meters, until the tire and wheel assembly 32 crosses the curve 91. The trajectory portion traveled by the tire and wheel assembly 32 corresponds to an arc of a circle 76, whose radius of curvature is less than the radius of curvature of the arc of a circle 75. Once again, the transverse acceleration of the vehicle 10 is recorded. These runs are repeated, increasing the steering angle by 30° steps until at least one condition selected from among the following is fulfilled: (i) the tire becomes unseated or (ii) the steering wheel of the vehicle 10 reaches its stop. The Figure shows the arcs of circles 77 to 79 which correspond to steering angles of 150°, 180° and 210°.

FIG. 8 shows a second embodiment of the invention in which the trajectory 100 traveled by the tire and wheel assembly 32 until one of the two conditions (i) or (ii) is fulfilled is an uninterrupted succession of arcs of circles. As in the previous embodiment, the steering axle 21 of the vehicle 10 is equipped with a tire and wheel assembly 32 comprising the tire to be evaluated, the inflation pressure of which is zero. The vehicle starts off at the constant speed of 60 km/h along a straight line 71. Having reached point 110, the driver increases the steering angle with a speed of rotation of the steering wheel of greater than 500° per second. The test conditions (fitting of tire, direction of rotation of steering wheel) are selected such that the tire and wheel assembly 32 is located on the side of the vehicle 10 which is on the outside relative to the centre of curvature of each trajectory portion. In the example shown, the steering angle is increased in steps of discrete values: it is maintained for a predetermined time or over a predetermined distance, in this instance for two seconds. The direction of rotation of the steering wheel remains unchanged for the duration of the test.

The principal difference relative to the first embodiment relates to the trajectory traveled by the tire and wheel assembly 32 between two trajectory portions consisting of arcs of circles. Instead of returning the vehicle 10 to the starting point, the driver immediately proceeds to increase the steering angle, which has the effect of causing the tire and wheel assembly 32 to travel over a trajectory in the form of a spiral, composed of a plurality of arcs of circles whose radii of curvature diminish progressively. The points 111 to 113 correspond to the changes in steering angle. The steering angle is increased until at least one condition selected from among the following is fulfilled: (i) the tire becomes unseated or (ii) the steering wheel of the vehicle 10 reaches its stop. The transverse acceleration of the vehicle 10 is recorded for each value of the steering angle.

FIG. 9 shows another embodiment of the invention in which two successive arcs of circles are separated by an intermediate trajectory portion. As in the previous embodiment, the steering axle 21 of the vehicle 10 is fitted with a tire and wheel assembly 32 comprising the tire to be evaluated, the inflation pressure of which is lower than its service pressure. The vehicle starts off at the constant speed of 60 km/h along a straight line 71. Having reached line 131, which may be marked out on the ground, the driver increases the steering angle with a speed of rotation of the steering wheel of greater than 500° per second. The test conditions (fitting of tire, direction of rotation of steering wheel) are selected such that the tire and wheel assembly 32 is located on the side of the vehicle 10 which is on the outside relative to the centre of curvature of each trajectory portion in the form of an arc of a circle. In the example shown, the steering angle is maintained for the time required for the vehicle to cross the line 131 again; the tire and wheel assembly 32 thus travels over a semi-circle 121. Then, the driver causes the vehicle to advance in a straight line until it crosses the line 132. He then increases the steering angle in such a way that the tire and wheel assembly travels over a second arc of a circle 122, whose radius of curvature is less than that of the arc of a circle 121. When the tire and wheel assembly 32 crosses the line 132 again, the driver causes the vehicle to advance in a straight line as far as the line 131 etc. The "useful part" of the trajectory is composed of arcs of circles 121–125, whose radii of curvature diminish progressively. The driver increases the steering angle progressively until at least one condition selected from among the following is fulfilled: (i) the tire becomes unseated or (ii) the steering wheel of the vehicle 10 reaches its stop. The transverse acceleration of the vehicle 10 is recorded for each value of the steering angle.

The conditions for implementing the example shown in FIG. 9 were selected so as to obtain a particularly simple trajectory geometry. A variant of the example would be to maintain the various steering angles for a single predetermined period (in other words, to travel over arcs of circles of equal length) instead of traveling over semi-circles. In this variant, it is more difficult to mark out reference lines of the type 131 and 132; consequently, after each arc of a circle, the driver causes the vehicle to advance in a straight line for a predetermined period.

Figure 10:
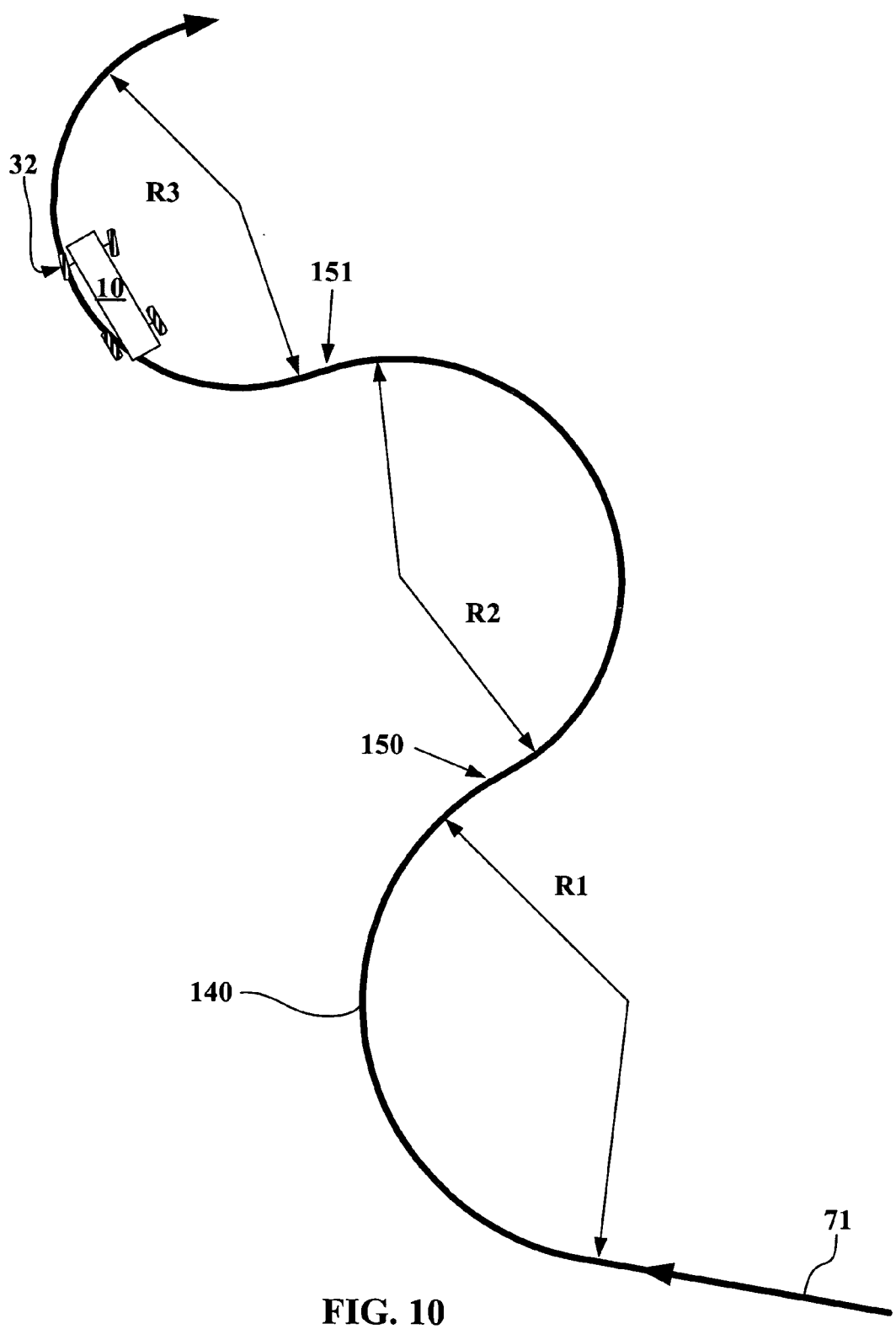

FIG. 10 shows another embodiment of the invention in which the trajectory 140 traveled by the tire and wheel assembly 32 until one of the two conditions (i) or (ii) is fulfilled is an uninterrupted succession of arcs of circles. The difference relative to the second embodiment is that two successive rotations of the steering wheel, each serving to impose a steering angle, are made in mutually opposing directions. The points 150 and 151 correspond to reversal of the direction of rotation of the steering wheel. The tire and wheel assembly 32 travels over a serpentine trajectory 140 composed of a plurality of arcs of circles whose radii of curvature diminish progressively: R1>R2>R3. This embodiment may be preferable when it is wished to alternate the inside or outside positioning of the tire and wheel assembly 32 relative to the centre of curvature of each of the trajectory portions consisting of arcs of circles, in particular when it is wished to evaluate simultaneously two tire and wheel assemblies mounted on the same steering axle. In this case, it may be preferable to travel systematically over two arcs of circles of the same radius of curvature obtained with the same steering angle, but with opposed directions of rotation of the steering wheel, before increasing the steering angle and reducing the radius of curvature. Thus, for each radius of curvature, each of the two tires is evaluated in the inside position and in the outside position relative to the centre of curvature.

Figure 11:
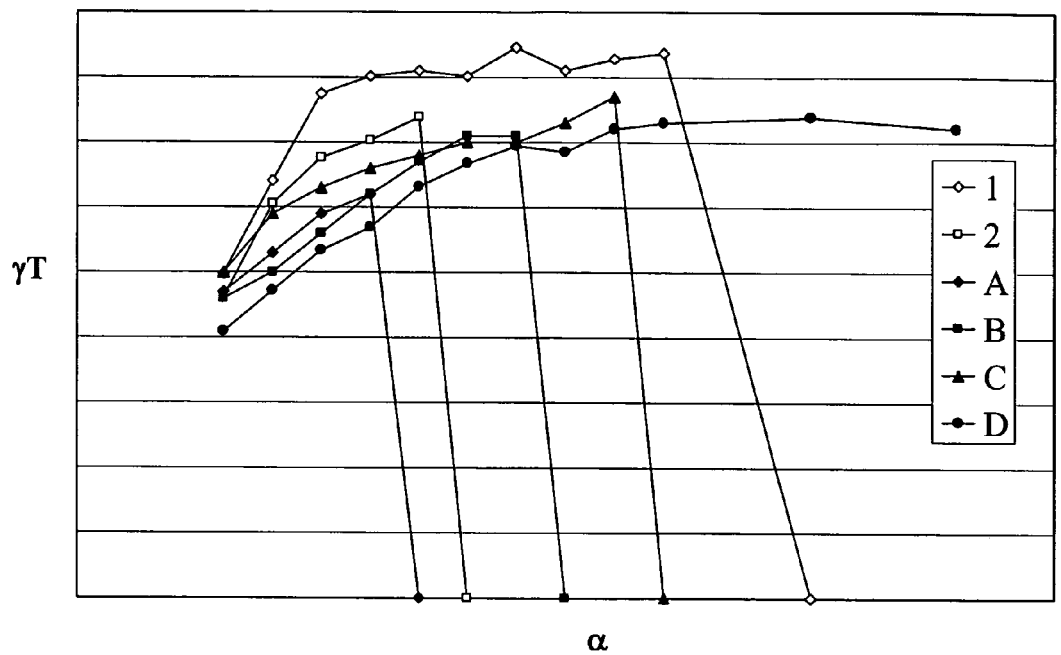
FIG. 11 shows how lateral acceleration develops as a function of the steering angle for a plurality of tire architectures.

FIG. 11 shows how the transverse acceleration γT develops as a function of the steering angle α, for tires of dimension 225/50R17. The tests were performed according to the first embodiment, using a BMW 330 as the vehicle and at a speed of 60 km/h. The maximum transverse acceleration during each arc of a circle was determined using onboard measuring equipment (VBOX). The curves "1" and "2" (outline symbols) correspond to a conventional tire, inflated to 1 bar and 0.6 bar. The curves "A", "B", "C" and "D" (solid symbols) correspond to different run-flat tires, at zero inflation pressure. A γT value of zero means that the tire has suffered unseating. Depending on the design selected, the tires suffer unseating at different steering angles: only tire design "D" resists unseating up to extreme steering angles.

The table below illustrates the reproducibility of the results obtained. $\alpha_{max}$ denotes the steering angle at which the test was stopped, either because the tire suffered unseating, or because the steering wheel of the vehicle had reached its stop; $\gamma T_{max}$ denotes the maximum transverse acceleration measured. Three tires of different design were tested twice.

| Tire | | Test: 1 | Test: 2 | Value selected |
|---|---|---|---|---|
| "E" | $\alpha_{max}$ | 210 | 240 | 210 |
|  | $\gamma T_{max}$ | 0.68 | 0.72 | 0.68 |
|  | Unseating? | yes | yes | |
| "F" | $\alpha_{max}$ | 210 | 270 | 210 |
|  | $\gamma T_{max}$ | 0.67 | 0.75 | 0.67 |
|  | Unseating? | yes | yes | |
| "G" | $\alpha_{max}$ | 540 | 450 | 450 |
|  | $\gamma T_{max}$ | 0.70 | 0.70 | 0.70 |
|  | Unseating? | no | yes | |

Of course, these results depend, inter alia, on the vehicle used, since, depending on the vehicle, the same steering angle may not correspond to the same angle at the level of the tire.

Figure 12:
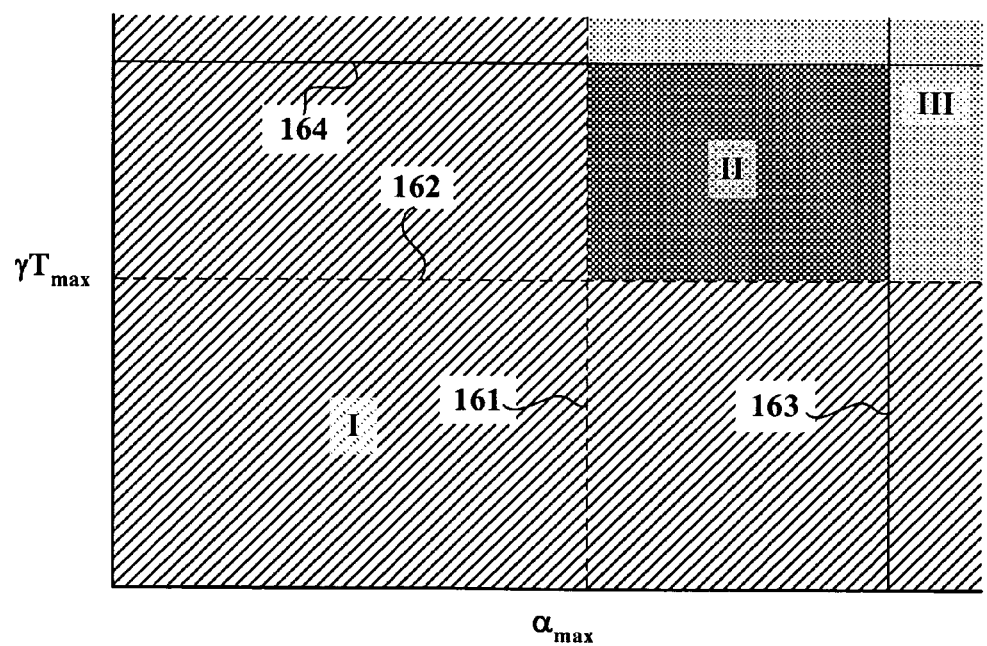
FIG. 12 is a schematic representation of a diagram allowing the classification of tires in relation to unseating.

The values $\alpha_{max}$ and $\gamma T_{max}$ make it possible to classify different types of run-flat tires. FIG. 12 is a schematic representation of a diagram allowing classification of a tire in three categories. The tires belonging to category "I" suffer unseating at steering angles (below the value indicated by the dashed line 161) or at transverse acceleration values (below the dashed line 162) which a non-professional user may possibly reach; they are thus considered as being in need of improvement. The tires in category "III" do not suffer unseating, even at angles corresponding to the point where the steering wheel reaches its stop (solid line 163), or suffer unseating at accelerations which are inaccessible to a non-professional driver (above the solid line 164); they may be considered satisfactory. The intermediate category "II" covers tires which are satisfactory in the vast majority of cases, but whose behavior may be restrictive for certain types of vehicle, certain drivers etc.

This three-category classification is only an example. It is of course possible to develop more precise criteria on the basis of the values $\alpha_{max}$ and $\gamma T_{max}$, allowing objective classification of different types of tires.

If it is wished to effect relative classification of tires inflated to a predetermined pressure which do not become unseated in a test performed at a predetermined speed according to one of the embodiments described above, it is possible to repeat the tests at a lower inflation pressure and/or at a higher speed to distinguish between the tires.

The method according to the invention makes it possible to compare precisely the resistance to unseating of different types of tires by increasing the steering angle while maintaining a constant speed. It is possible to envisage another method consisting in imposing a fixed steering angle and increasing the speed until unseating is achieved, but this method suffers from a lack of reproducibility of the increase in speed (difficulty in accelerating at a high rate of drift) and necessitates a large test surface area because the circle traveled by the vehicle widens when the speed increases.

We claim:

1. A method of determining the resistance to unseating of at least one tire mounted on a mounting rim and inflated to a predetermined pressure, this method comprising:
   (A) equipping a vehicle with the tire in a steering axle position;
   (B) setting the vehicle in motion;
   (C) stabilizing the moving vehicle in a substantially linear direction at a predetermined speed;
   (D) imposing a steering angle, by rotation of the steering wheel, and maintaining the steering angle for a predetermined period, wherein the vehicle advances at the predetermined speed in such a way that the tire travels over a trajectory portion in the form of an arc of a circle; and
   (E) if the tire does not unseat during step (D), repeating step (D) at greater respective steering angles until at least one of the following conditions is fulfilled:
      (i) the tire becomes unseated
      (ii) the steering wheel of the vehicle reaches its terminal stop.

2. The method according to claim 1 further wherein step (C) is repeated after step (D) and prior to step (E).

3. The method according to claim 2 wherein the trajectory arcs of steps (D) and (E), respectively, have substantially the same point of origin.

4. The method according to claim 1 wherein after step (D) and prior to step (E), step (C) is repeated, beginning at the end of the trajectory arc of step (D).

5. The method according to claim 4 wherein steps (D) and (E) are performed by rotating the steering wheel in the same direction.

6. The method according to claim 4 wherein steps (D) and (E) are performed by rotating the steering wheel in alternating opposite directions.

7. The method according to claim 1 wherein the steering angle imposed in step (D) is equal to an angle $\alpha_0$ different from 0°, this angle then being increased in step (E) in steps of angle $\Delta\alpha$, wherein $\Delta\alpha$ is a fraction of the angle $\alpha_0$.

8. The method according to claim 1, wherein each increase in steering angle is performed at a speed of rotation of the steering wheel greater than 300° per second.

9. The method according to claim 1 wherein the tire to be evaluated is located on the vehicle on the outside relative to a center of curvature of each of the trajectory arcs.

10. The method according to claim 1 wherein each increase in steering angle is accompanied by an increase in speed of the vehicle.

11. The method according to claim 1 wherein the tire has zero internal air pressure.

12. The method according to claim 1 wherein the rotation of the steering wheel is assisted by a power mechanism of the vehicle.

* * * * *